United States Patent
Subramanian et al.

(10) Patent No.: US 8,392,623 B2
(45) Date of Patent: Mar. 5, 2013

(54) GUEST/HYPERVISOR INTERRUPT COALESCING FOR STORAGE ADAPTER VIRTUAL FUNCTION IN GUEST PASSTHROUGH MODE

(75) Inventors: Hariharan Subramanian, Wakefield, MA (US); Edward J. Goggin, Concord, MA (US); Vibhor Patale, Bangalore (IN); Rupesh Bajaj, Dewas Madhya Pradesh (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/483,869

(22) Filed: May 30, 2012

(65) Prior Publication Data

US 2012/0239832 A1    Sep. 20, 2012

Related U.S. Application Data

(63) Continuation of application No. 12/687,999, filed on Jan. 15, 2010, now Pat. No. 8,291,135.

(51) Int. Cl.
*G06F 3/00* (2006.01)
*G06F 13/00* (2006.01)

(52) U.S. Cl. .................. 710/5; 710/2; 710/8; 710/33

(58) Field of Classification Search .................. None
See application file for complete search history.

(56) References Cited

U.S. PATENT DOCUMENTS

2004/0117534 A1* 6/2004 Parry et al. .................. 710/260
2009/0119538 A1* 5/2009 Scales et al. .................. 714/6

OTHER PUBLICATIONS

Suparna Bhattacharya, Linux Asynchronous I/O Design: Evolution & Challenges, 2008, IBM, [online, accessed on Aug. 13, 2011], URL: http://www.kernel.org/pub/linux/kernel/people/suparna/aio-linux.pdf, pp. 1-24.

* cited by examiner

Primary Examiner — Scott Sun

(57) ABSTRACT

A method is described for coalescing input/output (IO) interrupts to a virtual machine (VM) running on a host computer. At a virtualization layer of the host computer that supports execution of the VM receives an IO interrupt in response to a completion of an IO request of the VM, wherein a transmission of the IO request by the VM to an IO device bypasses the virtualization layer. The virtualization layer then determines whether the VM has responded to a most recently delivered IO interrupt to the VM by the virtualization layer, and drops the IO interrupt if the VM has not responded to the most recently delivered IO interrupt, thereby failing to deliver the IO interrupt to the VM.

20 Claims, 12 Drawing Sheets

Contents of the User/Hypervisor Shared Memory

```
// Count of the last acknowledged virtual interrupt
// from the VM
// Exclusively written by the guest VM
uint32      ptIsrRsp;

// Count of the last acknowledged virtual interrupt
// from the hypervisor
// Exclusively written by the guest VM
uint32      ptIrqCmd;

// Count of the number of outstanding IOs from the VM
// Exclusively written by the guest VM
int32       ptOutIOs;

// State of the VF queue when the last I/O was received by the VM
// specifically the completion queue's producer index
// This piece of information is hardware type specific
// Exclusively written by the guest VM
uint32      ptCmpProdIdxLastIntr:
```

GUEST/HYPERVISOR INTERRUPT COALESCING FOR STORAGE ADAPTER VIRTUAL FUNCTION IN GUEST PASSTHROUGH MODE

CROSS-REFERENCES TO RELATED APPLICATIONS

This application is a continuation of prior patent application Ser. No. 12/687,999 filed on Jan. 15, 2010 and entitled "Guest/Hypervisor Interrupt Coalescing For Storage Adapter Virtual Function In Guest Passthrough Mode," which is incorporated by reference herein. This application is also related to patent application Ser. No. 12/689,152 filed Jan. 18, 2010 and entitled "Virtual Target Addressing during Direct Data Access via VF of IO Storage Adapter", patent application Ser. No. 12/689,162 filed Jan. 18, 2010 and entitled "Configuring VM And IO Storage Adapter VF for Virtual Target Addressing During Direct Data Access", and patent application Ser. No. 12/691,550 filed Jan. 21, 2010 and entitled "Virtual Machine Access to Storage via a Multi-Queue IO Storage Adapter with Optimized Cache Affinity and PCPU" titled "Virtual Machine Access to Storage via a Multi-Queue IO Storage Adapter with Optimized Cache Affinity and PCPU Load Balancing," all of which are incorporated by reference herein.

BACKGROUND

A virtual machine involves—a "virtualization"—which an actual physical machine is configured to implement the behavior of the virtual machine. Multiple virtual machines (VMs) can be installed on a physical host machine, referred to as a 'host', which includes physical system hardware that typically includes one or more physical processors (PCPUs) and physical memory and various other physical devices, such as an IO storage adapter to perform protocol conversions required to access a remote storage such as over a storage access network (SAN). A VM typically will have both virtual system hardware and guest system software including virtual drivers used for various virtual devices. The virtual system hardware ordinarily includes one or more virtual processors, virtual memory, at least one virtual disk, and one or more virtual devices all of which may be implemented in software using known techniques to emulate the corresponding physical components. One or more layers or co-resident software components comprising a virtualization intermediary, e.g. a virtual machine monitor (VMM), hypervisor or some combination thereof that acts to instantiate and provision VMs and to allocate host resources dynamically and transparently among the VMs so that their respective guest operating systems can run concurrently on a single physical machine.

Interrupts are used in modern computing systems for a variety of purposes including, by way of example, to notify processors of external events and to facilitate communication between processors of a multiprocessor system. Typically, an interrupt interrupts normal processing and temporarily diverts flow of control to an interrupt service routine ("ISR"). Various activities of a computing system can trigger interrupts. Some examples are reading or writing from a data storage device and receiving a network packet. Computing systems typically comprise one or more interrupt controllers that direct and arbitrate the flow of interrupts in a system. Interrupt controllers are responsible for prioritizing incoming interrupts and directing them to the appropriate processor in a multiprocessor system. An interrupt controller may be realized in hardware and as such may comprise a discrete component or may be integrated with processors.

Interrupt controllers also may be virtualized. This is typically accomplished through a combination of software and virtualization assists provided by hardware. The software may be a part of a virtual machine monitor that performs the same basic functions as a physical interrupt controller. Typically, a VMM accepts physical interrupts and redirects them to guest operating systems as virtual interrupts.

High input/output (IO) rate applications such as datacenter applications can issue hundreds of very small IO operations in parallel resulting in tens of thousands of IOs per second (IOPS). For high IO rates, the processor overhead for handling all the interrupts can become quite high and eventually can lead to lack of processor resources for the application itself. Processor overhead can be even more of a problem in virtualization scenarios where many virtual machines run on a single multi-processor system, for example.

Traditionally, interrupt coalescing or moderation has been used in IO storage controller cards to limit the number of times application execution is interrupted by the device to handle IO completions. Interrupt coalescing may involve dropping an interrupt so that it is never delivered or delaying delivery of an interrupt. Interrupt coalescing techniques generally balance an increase in IO latency with the improved execution efficiency that can be achieved through a reduction in the number of interrupts. In hardware controllers, fine-grained timers have been used in conjunction with interrupt coalescing to keep an upper bound on the latency of IO completion notifications. However, such timers can be inefficient to use in a hypervisor.

One proposed virtualized system using virtualized interrupts includes a hypervisor (e.g., VMKernel) and a virtual machine monitor (VMM). See, I. Ahmad, A. Gulati, and A. Mashtizadeh, "Improving Performance with Interrupt Coalescing for Virtual Machine Disk I/O in VMware ESX Server," *Second International Workshop on Virtualization Performance: Analysis, Characterization, and Tools (VPACT'09)*, held with IEEE International Symposium on Performance Analysis of Systems and Software (ISPASS), 2009. The hypervisor controls access to physical resources among virtual machines (VMs) and provides isolation and resource allocation among virtual machines running on top of it. The VMM is responsible for correct and efficient virtualization of the processor instruction set architecture as well as common, high performance devices made available to the guest. The VMM is the conceptual equivalent of a "process" to the hypervisor. The VMM intercepts the privileged operations from a VM including IO and handles them in cooperation with the hypervisor.

FIG. 1 is an illustrative drawing showing flow of an interrupt that services an IO completion in a computing system, which includes a virtual machine (VM) running on virtual machine monitor (VMM) and a hypervisor that reside on a host machine that is coupled to a physical IO storage adapter. A hypervisor executing storage stack code on the physical processor is shown on the right and an example VM (and Guest operating system) running on top of its virtual machine monitor (VMM) running on the processor is shown on the left. An interrupt is received from an IO storage adapter during a first stage 102 of the flow. During a second stage 104, appropriate code in the hypervisor is executed to handle the IO completion all the way up to a vSCSI subsystem which narrows the IO to a specific VM. In a third stage 106, the hypervisor posts IO completions in a queue in which each VMM shares a common memory area with the hypervisor. During a fourth stage 108, the hypervisor may issue an interprocessor interrupt or IPI to notify the VMM. During a fifth stage 110, the VMM can pick up the completions on its next execution and process them in a sixth stage 112. A virtual interrupt is fired in a seventh stage 114.

In this proposed system, improved performance of high-IOPS workloads, in terms of higher throughput and lower CPU utilization, can be achieved through interrupt coalescing to allow for some batching of I/O completions to happen at the guest level. In order to avoid the undesirable side-effect of increasing latency, this coalescing only occurs when I/O levels exceed a threshold. This threshold can be set high enough that performance does not degrade under trickle I/O or latency-bound conditions.

SUMMARY

One or more embodiments herein support a method for coalescing input/output (IO) interrupts to a virtual machine (VM) running on a host computer. According to the method, at a virtualization layer of the host computer that supports execution of the VM receives an IO interrupt in response to a completion of an IO request of the VM, wherein a transmission of the IO request by the VM to an IO device bypasses the virtualization layer. The virtualization layer then determines whether the VM has responded to a most recently delivered IO interrupt to the VM by the virtualization layer, and drops the IO interrupt if the VM has not responded to the most recently delivered IO interrupt, thereby failing to deliver the IO interrupt to the VM.

Another aspect of a method and system of one embodiment involves use of a host machine and an Single Root I/O Virtualization (SR IOV) storage adapter in which the host machine hosts a virtual machine and a virtualization intermediary and in which the virtual machine has a guest operating system (guest) coupled for direct passthrough I/O Virtualization (IOV) data path. The guest operating system execution context makes an IO request that results in an IO completion. An interrupt may be generated by the virtualization intermediary execution context that interrupts the guest and causes it to process the IO completion. However, interrupts may be coalesced by the virtualization intermediary based upon information shared between the guest and the virtualization intermediary in a shared memory space.

In a further aspect of some embodiments, the guest and the virtualization intermediary exchange information concerning IO completions through a shared memory space. The guest writes information to the shared memory space that is indicative of whether an IO completion queue has reached a fill level since the most recently dispatched interrupt at which it is unsafe to coalesce an interrupt. The virtualization intermediary writes information to the shared memory space that is indicative of the interrupt most recently delivered to the guest. The virtualization intermediary reads the information written by the guest to the shared memory space The guest reads the information written to the shared memory space by the virtualization intermediary. Virtual interrupt coalescing determinations are made by the virtualization intermediary based upon the information shared between the guest and the virtualization intermediary through the shared memory space. Accordingly, virtual interrupts coalescing determinations are made in which an IO request is made by a virtual machine in a guest operating system execution context and a virtual interrupt responsive to a completion of the IO request is generated in the virtualization intermediary execution context.

In yet a further aspect, a method and system are provided in which a guest operating system (guest) writes to shared memory space information indicative of a volume of outstanding IO requests issued by the guest that have not yet reached an IO completion queue. A virtualization intermediary reads from the shared memory space the information written there by the guest and makes a determination of whether to deliver or to coalesce an interrupt based at least in part upon the volume of outstanding IO requests. In another aspect, the virtualization makes the determination of whether to deliver or to coalesce an interrupt in part based upon a measure of interrupt latency.

BRIEF DESCRIPTION OF THE DRAWINGS

FIG. 5 is an illustrative drawing of a shared memory region in which to share virtual interrupt related state information between the guest OS VF driver and the virtualization intermediary in the system of FIG. 4.

DETAILED DESCRIPTION OF THE EMBODIMENTS

Figure 1:
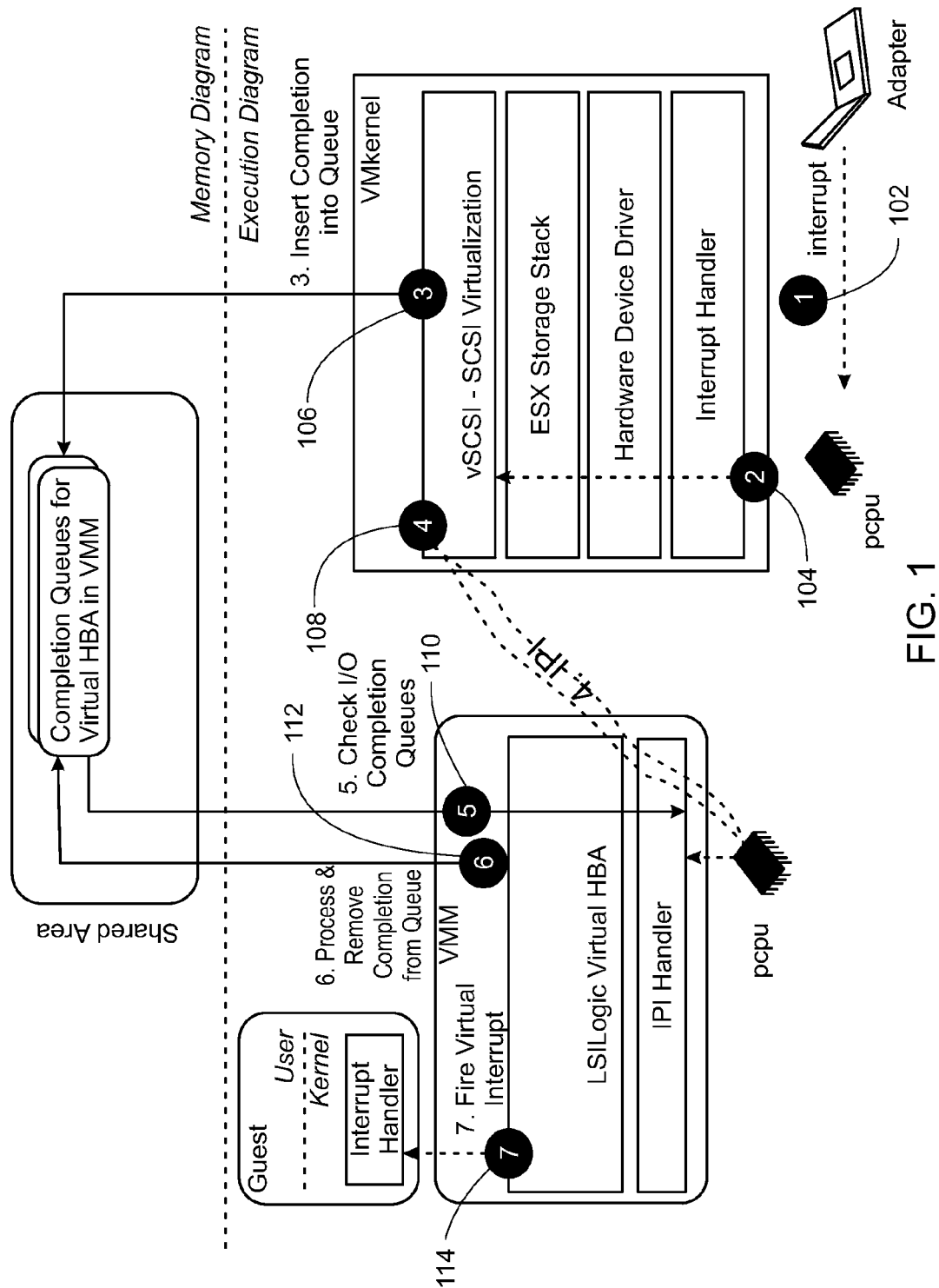
FIG. 1 is an illustrative drawing showing flow of an interrupt that services an IO completion in a computing system, which includes a virtual machine (VM) running on virtual machine monitor (VMM) and a hypervisor that reside on a host machine that is coupled to a physical IO storage adapter.

The following description is presented to enable any person skilled in the art to create and use a virtualized computer system configured for use with a physical IOV adapter to coalesce virtual interrupts associated with IO completions on a passthrough data path, and is provided in the context of particular uses and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

PCI SR-IOV

Many modern computing devices employ input/output (IO) adapters and buses that utilize some version or implementation of the Peripheral Component Interconnect (PCI) standard, which specifies a computer bus for attaching peripheral devices to a computer motherboard. PCI Express (PCIe) is an implementation of the PCI computer bus that uses existing PCI programming concepts, but bases the computer bus on a different and much faster serial physical-layer communications protocol. In addition to the PCI and PCIe specifications, the PCI-SIG has defined input/output virtualization (IOV) standards for defining how to design an IO adapter that can be shared by several virtual machines.

The term "function" is used in the PCI context to signify a device with access controlled by a PCI bus. A PCI function is identified within a single PCI root complex by its PCI or PCIe bus, device, and slot identifiers. A PCI function includes a configuration space, which includes both device dependent and device independent regions used by host software to support device relocation on the PCI bus, flexible device-to-interrupt binding, device identification, and device configuration. A function also includes memory space which is identified by Barrier Address Registers in configuration space and provides a memory mapped I/O interface for host I/O initiated from host to the device. A PCIe function also includes message space which is identified by MSI and MSI-X capabilities in configuration space and provides either or both MSI/MSI-X message based interrupt generation. Many network (e.g., Ethernet) and storage (e.g., disk) adapters are implemented as PCI or PCIe compliant adapters and are recognized by a machine's PCI sub-system as a single PCI function. Multi-port PCI or PCIe adapters simply appear to a host PCI sub-system as multiple PCI functions.

Figure 2:
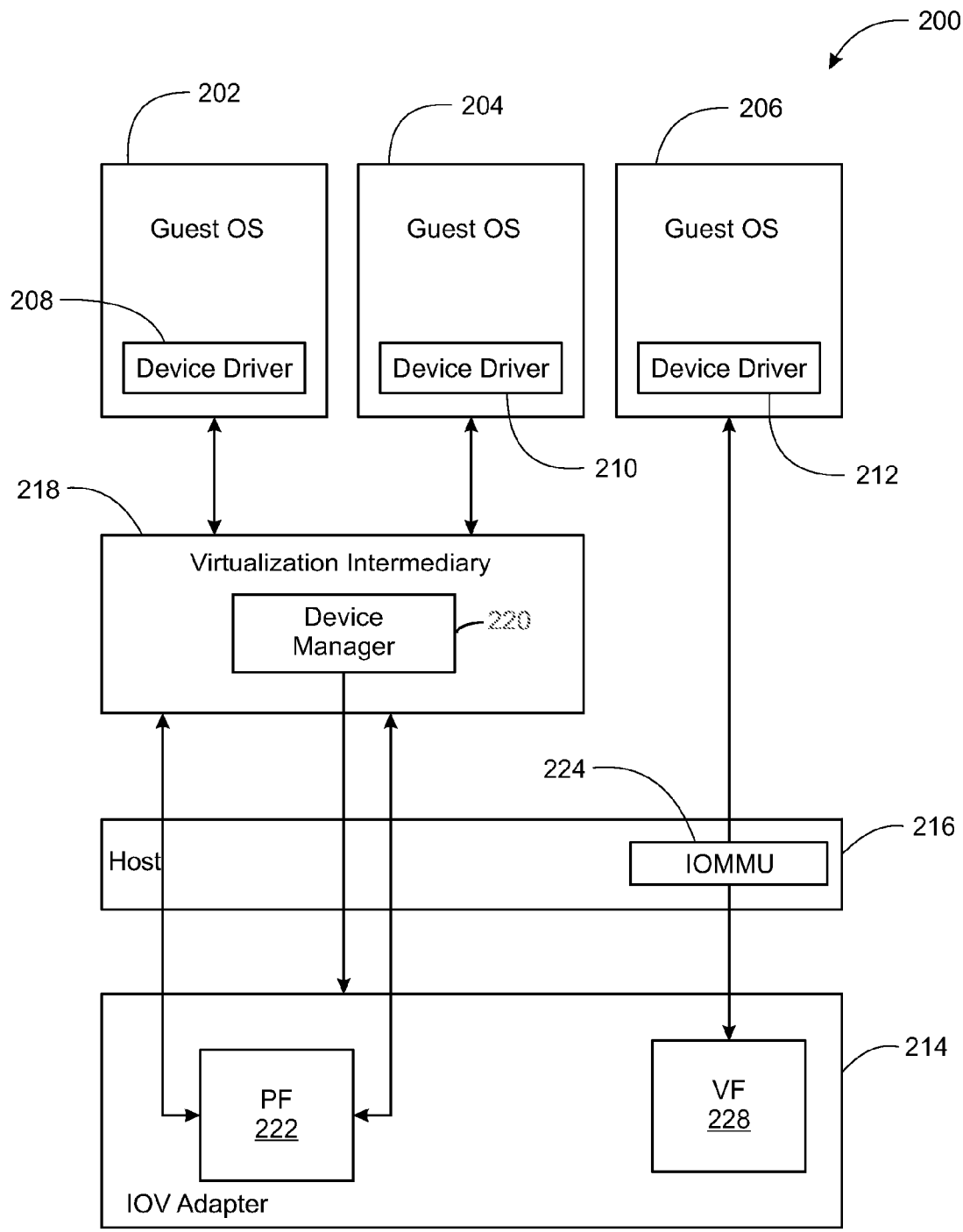
FIG. 2 is an illustrative drawing of a virtualized system including SR-IOV virtualization.

FIG. 2 is an illustrative drawing of a virtualized system 200 including SR-IOV virtualization. Techniques specified in the PCI SR-IOV specification can be used to reduce the CPU impact of high throughput workloads by bypassing the virtualization intermediary. The term 'single root' refers to a single root complex as contrasted with a multiple root complex. In a PCI Express system, a root complex device couples the processor and memory subsystem to a PCI Express switch fabric comprised of one or more switch devices. The root complex generates transaction requests on behalf of the processor, which is interconnected through a local bus.

The illustrative system includes VMs 202-206, each independently running a separate (and possibly different) guest operating system. A virtualization intermediary layer 218 runs between the virtual machines 202-206 and a host machine 216. Device driver 208 of VM 202 and device driver 210 of VM 204 each drive a physical function (PF) 222, with intervention by the virtualization intermediary 218. Device driver 212 of VM 206 drives the virtual function (VF) 228, without intervention by the virtualization intermediary 218. The device driver 212 communicates with I/O MMU logic 224 disposed on the host machine 216 in the course of accessing data with mass storage (not shown). A device manager 220 within virtualization intermediary 218 manages the allocation and de-allocation of VFs for the IOV adapter 214. The IOV adapter 214 provides a memory-mapped input/output interface for IO and provides an interface for controlling VFs.

A typical IOV adapter includes processor, memory and network interface resources (not shown) to implement the PF and one or more virtual functions VFs. A PF is a PCIe function that supports the SR-IOV capabilities defined in the PCI SR-IOV specification. A PF is used to control the physical services of the device and to manage individual VFs.

A VF is a PCIe function which is associated with a particular physical function and shares physical PCI adapter resources (e.g., ports, memory) with that physical function and other virtual functions located on the same physical adapter. A virtual function has its own PCI configuration space, memory space, and message space separate from other physical or virtual functions on that same adapter. A physical function, such as PF 222 in this example that is associated with a virtual function 228 is responsible for allocating, resetting, and de-allocating that virtual function and the PCI resources required by that virtual function. In general, a VF can either be accessed via a virtualization intermediary or bypass the virtualization intermediary to be directly accessed by a guest OS. In the example system 200, VMs 202, 204 respectively access PF 222 via the virtualization intermediary 218, and VM 206 accesses VF 214 directly, i.e. without the virtualization intermediary 218. Thus, a VF can, without run-time intervention by a virtualization intermediary, directly be a sink for I/O and memory operations from a VM, and be a source of Direct Memory Access (DMA), completion, and interrupt operations to a VM.

SCSI Command Protocol

In some embodiments, an SR IOV compliant IO storage adapter acts as an interface to transfer data between a host machine's IO bus and SCSI storage, for example. For the purpose of this disclosure, it is assumed that the IO storage adapter implements a port based SCSI transport protocol, such as Fiber Channel, iSCSI or SAS to exchange data over a network. A SCSI initiator device is a SCSI device that contains application clients and SCSI initiator ports that originate device service and task management requests to be processed by a SCSI target device and receive device service and task management responses from SCSI target devices. A SCSI command descriptor block (CDB) identifies a target and a logical unit managed by the target. A SCSI target device is a SCSI device containing logical units and SCSI target ports that receive device service and task management requests for processing and sends device service and task management responses to SCSI initiator devices. A logical unit is an externally addressable entity within a SCSI target, such as disk, CD-ROM, tape drive, printer, scanner or any type of SCSI device, managed by a SCSI target that implements a SCSI device model and that contains a device server. The response ordinarily includes a status that indicates the final disposition of the command. See, SCSI Primary Commands—3 (SPC-3), Revision 23, Section 4.2, The request-response model, May 4, 2005, American National Standards for Information Systems—InterNational Committee for Information Technology Standards. (hereinafter "SPC-3, Revision 23")

Figure 3:
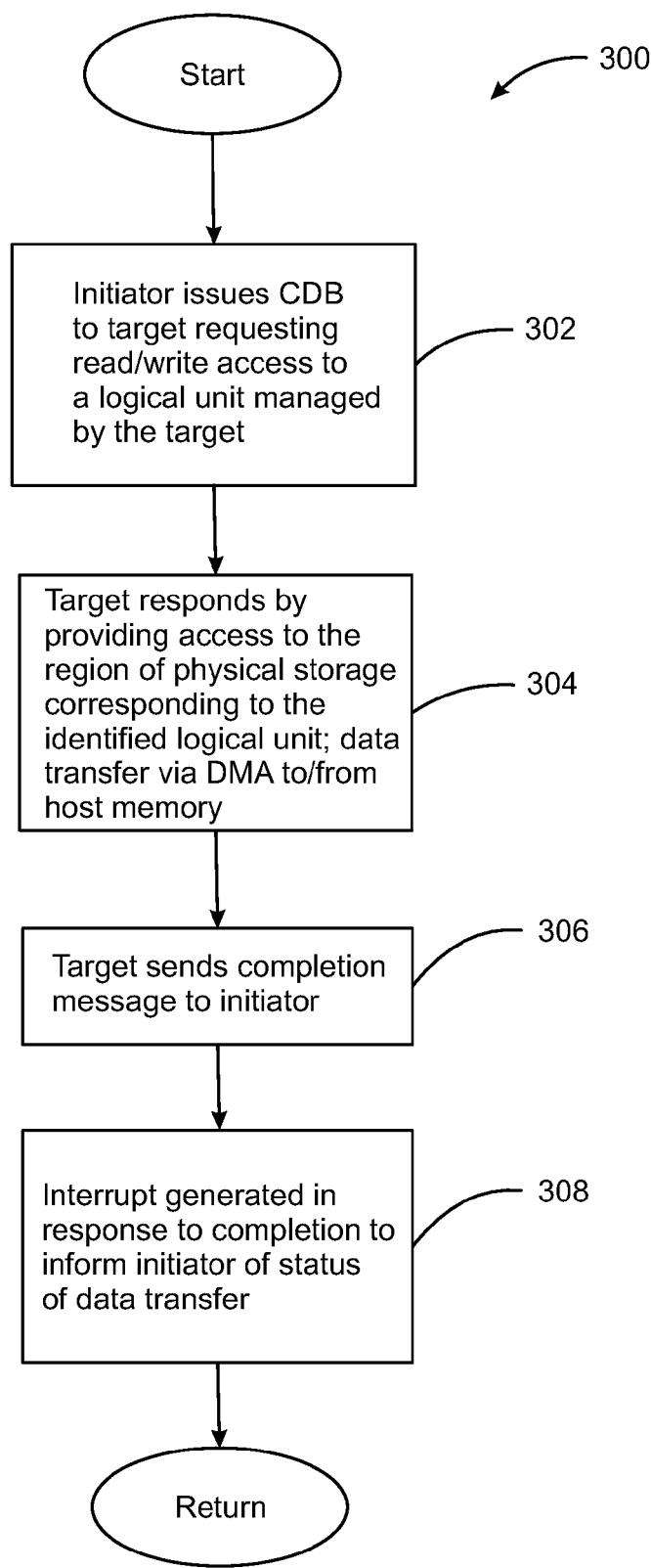
FIG. 3 is an illustrative flow diagram showing typical flow of a SCSI IO protocol and related DMA and interrupt.

FIG. 3 is an illustrative flow diagram showing typical flow 300 of a SCSI IO protocol and related DMA and interrupt. In step 302, a SCSI initiator packages a SCSI CDB, perhaps with the aid of a machine's operating system and sends the CDB over an IP network. The SCSI CDB is transmitted to the target, which responds in step 304 by providing access to the region of physical storage that corresponds to the logical unit. In particular, the SCSI target receives the CDB and sends it to a SCSI logical unit managed by the SCSI target. If the SCSI CDB specifies a 'Read' transaction, then DMA is employed to transfer data from the accessed region of physical storage to a memory region accessible to the initiator. If the SCSI CDB specifies a 'Write' transaction, then DMA is employed to transfer data to the accessed region of physical storage from a memory region accessible to the initiator. In step 306, the target sends a completion message directed to the initiator. The completion response typically includes a completion status that indicates the final disposition of the command. In step 308, an interrupt is generated in response to the completion message to inform the initiator of the receipt of the completion message.

Multiple IO commands can be issued concurrently i.e. a host system can issue a new SCSI Command before a prior SCSI Command completes. Moreover, one SCSI CDB seeking to access a (virtual target, virtual logical unit) combination can result in multiple "physical" SCSI commands to one or more physical SCSI logical units of one or more physical SCSI targets in which case a VF making an IOV request must wait until all of the multiple I/O commands to the multiple physical target, physical logical unit combinations have completed before 'completing' the IOV command.

IOV with Virtual Storage on Fast SR IOV Data Path

Figure 4:
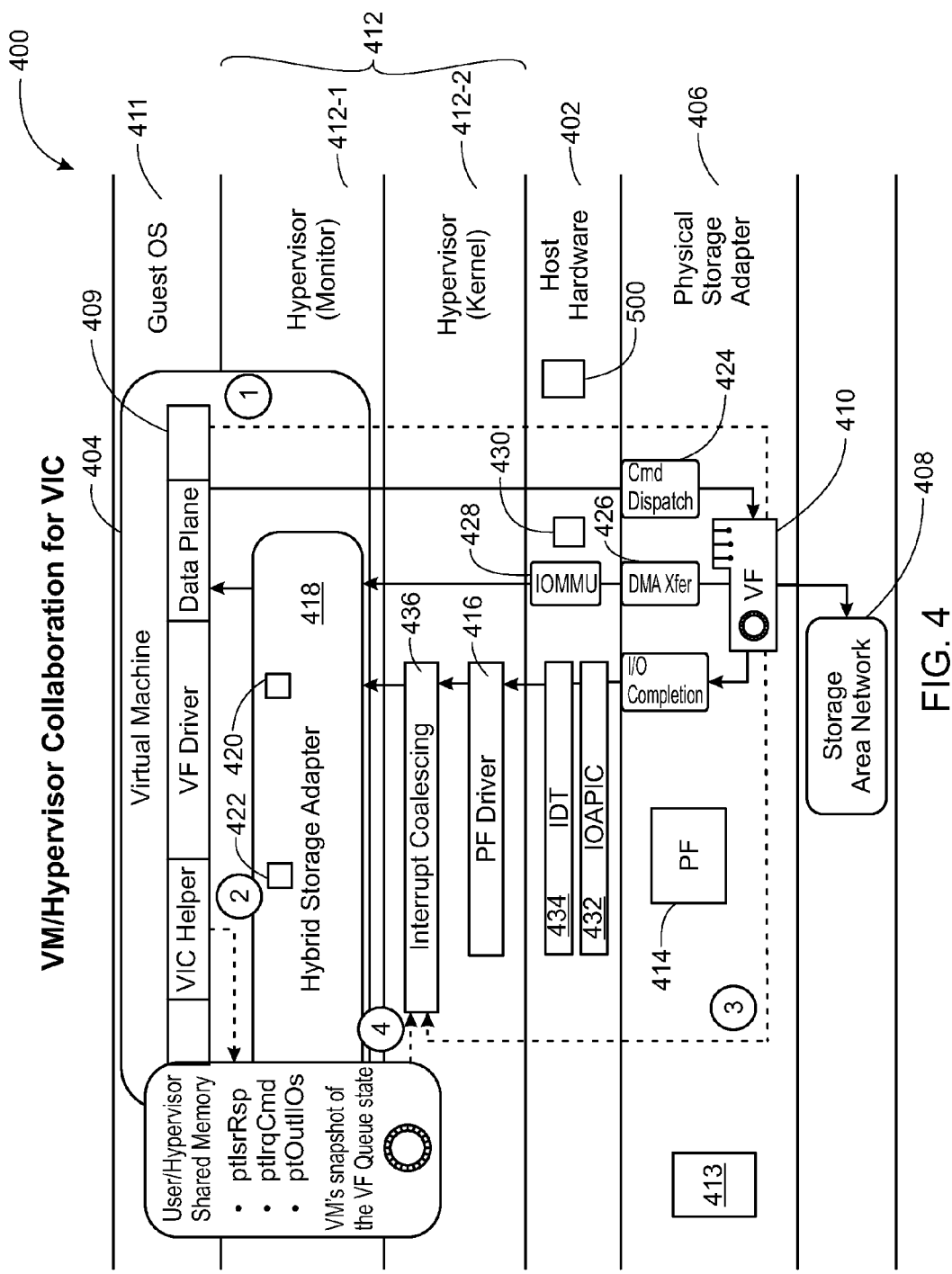
FIG. 4 is an illustrative drawing of a system that includes a host machine that hosts a virtual machine and that is coupled to an SR IOV compliant storage adapter.

FIG. 4 is an illustrative drawing of a system 400 that includes a host machine 402 that hosts a virtual machine 404 and that is coupled to an IOV storage adapter 406, which is compliant with the SR IOV specification, that adapts IO communications over a PCI bus protocol of the host machine 402 to SCSI storage access protocols used to access physical storage 408. The VM 404 includes a VF driver 409 that directs certain frequently occurring Read and Write SCSI commands over a direct passthrough IOV data path between the virtual machine 404 and a virtual function (VF) 410 without involvement of a virtualization intermediary 412. Other SCSI commands are processed through the virtualization intermediary 412. The software component referred to herein as a 'virtualization intermediary' serves as an interface between guest operating system software 411 within the VM 404 and the various hardware components and devices in the underlying host hardware platform 402. In the disclosed embodiment, the virtualization intermediary 412 includes a hypervisor monitor ("VMM") 412-1 and a hypervisor kernel ("VMkernel) 412-2. Multiple VFs (only one shown) may be instantiated within the system 400, and that each respective virtual machine (only one shown) may be associated with a different respective VF (only one shown) to create respective direct passthrough IOV data paths for certain frequently occurring Read and Write SCSI commands.

In this description, reference is sometimes made to the virtualization intermediary 412 or some other virtualized component taking some action. Persons skilled in the art will appreciate that the virtualization intermediary 412 comprises one or more software layers that run on the host system 402. In order to perform any given action, the virtualization intermediary 412 or other virtualized component employs resources of the host machine 402 to perform a given action. For example, the virtualization intermediary 412 may configure one or more physical processors, according to machine readable program code stored in machine readable storage media, to perform a virtual interrupt coalescing process.

The storage adapter 406 includes adapter resources 413 that include processor and memory resources and network protocol translation and interface resources, which will be readily understood by persons skilled in the art, to implement a physical function (PF) 414 and the virtual function (VF) 410 that is associated with virtual machine 404. A PF driver 416 communicates information between the PF 414 and the virtualization intermediary 412. The VF driver 409 communicates information with both the VF 410 and a hybrid storage adapter (HSA) emulation 418.

The hybrid storage adapter 418 is an emulated PCI storage adapter instantiated within the VM 404, which encapsulates a PCI SR-IOV virtual function of an SR-IOV compliant physical storage adapter presented by the virtualization intermediary 310 within a protected memory space of the virtual machine. The HSA 418 acts as the virtual machine's interface to the physical storage world, i.e. to the physical storage adapter 406. The HSA 418 'appears' to be a physical PCI device (i.e. a storage adapter) from the perspective of the virtual machine 404. The HSA 418 includes a first memory mapping space 420 supports direct access to physical storage 408 by providing a passthrough data path for the guest OS 411 of the virtual machine 404 to issue IO directly to the physical adapter 406 without intervention by the virtualization intermediary 412. The HSA 418 includes a second memory mapping space 422 that supports fully emulated access to physical storage 408 through the virtualization intermediary 412. While the HSA 418 is shown resident within a protected memory space of the virtual machine 404, it will be appreciated that it could instead reside within the virtualization intermediary 412.

The VF driver 409 is savvy as to the hybrid nature of the HSA 418, and as such is a 'para-virtual' device. The VF driver 409 directs certain SCSI IO Read/Write commands to the first memory mapped space 420 for direct access to physical storage 408 via the VF 410, and the VF driver 409 directs other SCSI commands to the second HSA PCI memory space 422 for fully emulated access to physical storage 408. Additional details of the HSA 418 and access to physical storage through the VF 410 are provided in commonly assigned U.S. patent application Ser. No. 12/689,152 filed on Jan. 18, 2010.

In operation, the VF driver 409 issues a request via the first memory mapped space 420 to a command dispatch logic 424 of the VF 410 to request access physical storage 408. The VF 410 responds by transmitting via the command dispatch logic 424 a SCSI CDB to the physical storage 408. If the request involves a Read then information is retrieved via from the accessed regions of physical storage 408. If the IO request involves a Write, then information is written to the accessed regions of physical storage 408. Assuming for the sake of this example, that the SCSI CDB transmitted by the VF 410 includes a Read command, and that such command is successfully processed by the storage 408, then the storage region 408 responds with by sending data to the VF 410, which employs DMA logic 426 in concert with IOMMU 428 logic of the host machine 402 to store the data in a region of host memory 430 reserved to receive the data requested through the SCSI CDB. The IO MMU logic 428 provides memory isolation for the DMA to/from physical pages assigned to each VM. In particular, the IOMMU logic 428 provides mapping for DMA operations so as to isolate the VM 404 guest OS 411 address space when providing direct assignment from such VM 404 guest OS 411 to the VF 410.

Continuing with the Read example, the data provided from the accessed region of the storage region 408 may comprise a plurality of data packets. The DMA logic 426 cooperates with IOMMU logic 428 within the host machine 402, to read the data directly into a region of host machine physical memory 430 that has been allocated to the virtual machine 404 running an application (not shown) that originally requested the data.

The DMA logic 426 stores retrieved data in the host memory address space specified in the SCSI CDB transmitted by the VF 410.

The storage region 408 sends a completion message to the VF 410 upon completion of the transmission of all data requested (in the case of a Read access) or upon receipt of all data that has been transmitted (in the case of a Write access). The completion message includes information indicative of whether the dispatched SCSI CDB completed successfully, and if the SCSI CDB did not complete successfully, the SCSI command completion includes information indicative of the nature of the error (or exception) that resulted in failure to properly complete.

IO completion logic of the VF 410 issues an interrupt such as an MSI or MSI-X interrupt using the MSI or MSI-X interrupt vector allocated and bound to the VF 410. The MSI or MSI-X interrupt is fielded by the host system's IO Advanced Programmable Interrupt Controller (IOAPIC) 432, which provides a map between the interrupt and code associated with the PF driver 414 (or higher level code in the virtualization intermediary 412) to service the interrupt. The IOAPIC directs the interrupt to a host system Interrupt Descriptor Table (IDT) 434 of a particular physical processor of the host system 402.

The virtualization intermediary 412 intercepts the physical interrupt from the IDT 434 and directs the interrupt to the PF driver 416, which realizes that the physical interrupt was issued by the VF 410 by detecting the MSI/MSI-X interrupt vector over which the interrupt was received. The PF driver 416, in turn, informs an interrupt coalescing unit 436, described more fully below, within the virtualization intermediary 412, which selectively delivers virtual interrupts to the hybrid storage adapter 418, which in turn, sends a virtual interrupt to the VF driver 409, which is part of the guest OS 411. The VF driver 409 services the interrupt by performing completion processing, which may involve processes such as de-queuing stored IO structures, providing access to Read data on memory pages allocated to the IO request by upper software layers, releasing IO structures and releasing memory pages, for example.

Moreover, it will be appreciated that when running in the SR IOV direct access mode, the SR IOV storage adapter 406 may generate a physical interrupt in response to a completion of an IO that is directly submitted by the guest OS 411 of the VM 404 as described above, or to asynchronously notify the guest operating system 411 of some event that happened on that VF 410.

Interrupt Coalescing

A non trivial amount of the computational cost of direct passthrough access to hardware from a guest OS 411 of a VM 404 is associated with delivering virtual interrupts to the guest operating system 411 to service IO completions. This is due at least in part to the fact that delivery of a virtual interrupt involves a guest process context being scheduled or the change of privilege level of a running guest context both of which are expensive operations.

Once the guest OS 411 receives an interrupt directing it to process an IO completion in its IO completion queue, it typically processes not only the IO completion corresponding to that interrupt, but every other IO completion waiting in the queue. Thus, a single interrupt can result in processing of multiple IO completions. The 'safe' and 'aggressive' interrupt coalescing processes of embodiments described herein take advantage of this behavior to coalesce interrupts.

Thus, it is desirable to reduce the number of interrupts through interrupt coalescing in which interrupt delivery is delayed under some circumstances such that a single interrupt results in the servicing of multiple IO requests waiting in a completion queue to be serviced, for example. Interrupt coalescing involves a tradeoff between IO throughput and latency of interrupt delivery. On the one hand, delivering a flurry of interrupts in short time intervals can reduce overall IO throughput due to the time required to service each of the interrupts. On the other hand, delaying the delivery of an interrupt can result in a delay completion of an IO.

A device uses information concerning previously generated interrupts and IO commands currently being processed to make an informed determination as to whether to raise or delay the delivery of an interrupt. In a direct access passthrough access to physical storage, the virtualization intermediary 412 issues IO completion interrupts to the virtual function driver 409 of the guest operating system 411. However, the guest operating system 411 actually completes IOs in response to such interrupts directly through a corresponding VF 410 of the SR IOV adapter 406 without involvement of the virtualization intermediary 412. Thus, there is a separation of the interrupt generation source (the virtualization intermediary) from the device serving an IO completion.

FIG. 5 is an illustrative drawing of a shared memory region 500 in which to share virtual interrupt related state information between the guest OS VF driver 409 and the virtualization intermediary 412. The shared memory region 500 is created as a part of the initialization for the hybrid storage adapter 418 and is used to manage the virtual function 410. The guest OS resident VF driver 409 and the virtualization intermediary 412 collaboratively maintain state information in the shared memory region 500 to track the latest virtual interrupt that was generated by the virtualization intermediary 412 and the latest virtual interrupt that was received by the guest OS VF driver 409. This information sharing allows the virtualization intermediary 412 to implement a first virtual interrupt coalescing strategy, referred to herein as a 'safe virtual interrupt coalescing strategy', by avoiding the delivery of a virtual interrupt when the guest OS VF 408 has not yet responded to a previously generated interrupt. When employing the safe strategy, the virtualization intermediary 412 coalesces virtual interrupts only when there is an outstanding virtual interrupt that is yet to be acknowledged by the guest OS resident VF driver 409. Thus, the safe scheme does not alter the latency characteristic of the I/O workload.

In addition, the guest OS VF driver 409 and the virtualization intermediary 412 collaboratively maintain state information about the state of the hardware registers that allows the virtualization intermediary 412 track the depth of the hardware IO completion ring VF 410 (i.e., the number of IO responses completed by the VF hardware but yet to be consumed by the guest OS VF driver 409) at any moment in time. To further reduce the rate of interrupt delivery, the virtualization intermediary implements a second virtual interrupt coalescing strategy, referred to herein as an 'aggressive virtual interrupt coalescing strategy', whereby the interrupt delivery rate is proportional to the number of SCSI IOs that are pending completion by the hardware aka the number of outstanding SCSI IO commands. When employing the aggressive strategy, the virtualization intermediary 412 produces virtual interrupts for only one in N IO completions received from the VF hardware. The value of N is selected to be proportional to the number of IO commands that are pending completion by the hardware at any moment in time. This includes the IOs on the request queue that have not been processed and those 'on the wire', i.e for which a CDB has been sent but no completion has yet been received.

Figure 6:
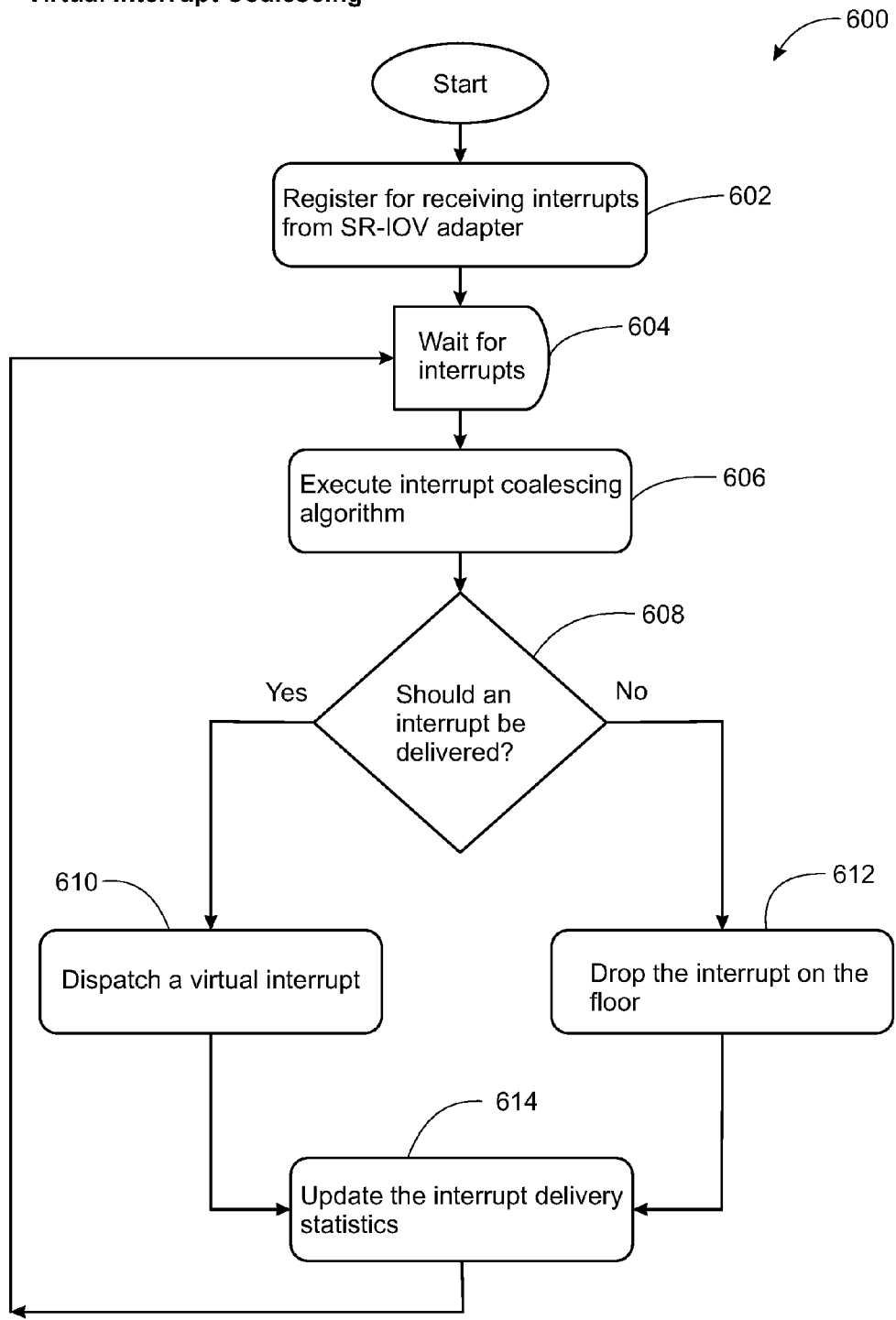
FIG. 6 is an illustrative flow diagram of an overall interrupt coalescing process performed by the virtualization intermediary of the system of FIG. 4.

FIG. 6 is an illustrative flow diagram of an overall interrupt coalescing process 600 performed by the virtualization intermediary 412 of the system of FIG. 4. Specifically, the process 600 is performed by the interrupt coalescing component 436 of the virtualization intermediary 412. The flow diagram of FIG. 6 includes a plurality of modules, each representing an aspect of the process that involves the virtualization intermediary 412 configuring one or more physical processors of the host system 402, according to machine readable program code stored in machine readable storage media of the host system 402, to perform a specified function of such module.

Module 602 involves registration of the interrupt coalescing unit 436 of the virtualization intermediary 412 with the PF driver 416. Decision module 604 involves the interrupt coalescing unit 436 waiting for interrupts delivered from the PF driver 416. Module 606 involves the unit 436 performing at least one of the first ('safe') and second (aggressive) interrupt coalescing processes defined by the user. Decision module 608 involves the unit 436 making an interrupt delivery decision based upon one or both of the first and second interrupt coalescing processes. Module 610 involves the unit 436 dispatching the virtual interrupt to the VF driver 409. Module 612 involves the unit 436 dropping the virtual interrupt. Module 614 involves the unit 436 updating the shared memory region 500 of FIG. 5.

In order to guarantee correctness of the shared data in the shared memory region 500 each state value is accessed by both of the execution contexts (i.e. virtualization intermediary or guest OS), however, only one of the execution contexts has read and write access for each data value. Any shared state data that can be accessed by both execution contexts is restricted to only one of those execution contexts for write access. As a result, there is no need for mutual exclusion and locking before updating state information. Accordingly, the guest and the virtualization intermediary run in two different execution contexts. Moreover, state information is updated asynchronously by the guest and the virtualization intermediary. While state values written by one execution context may affect state values written the other, the acts of reading and writing by the different contexts are not synchronized with each other.

The following Table 1 describes the read/write access rules for the state values in shared memory 500.

TABLE 1

(read/write access rules for execution contexts)

| State Value | Read Permission Context | Write permission Context |
|---|---|---|
| second state variable (ptIsrRsp) | virtualization intermediary | guest OS |
| first state variable (ptIrqCmd) | guest OS | virtualization intermediary |
| tally value (ptOutIOs) | virtualization intermediary | guest OS |
| snapshot value (ptCmpProdIdxLastIntr) | virtualization intermediary | guest OS |

Figure 7:
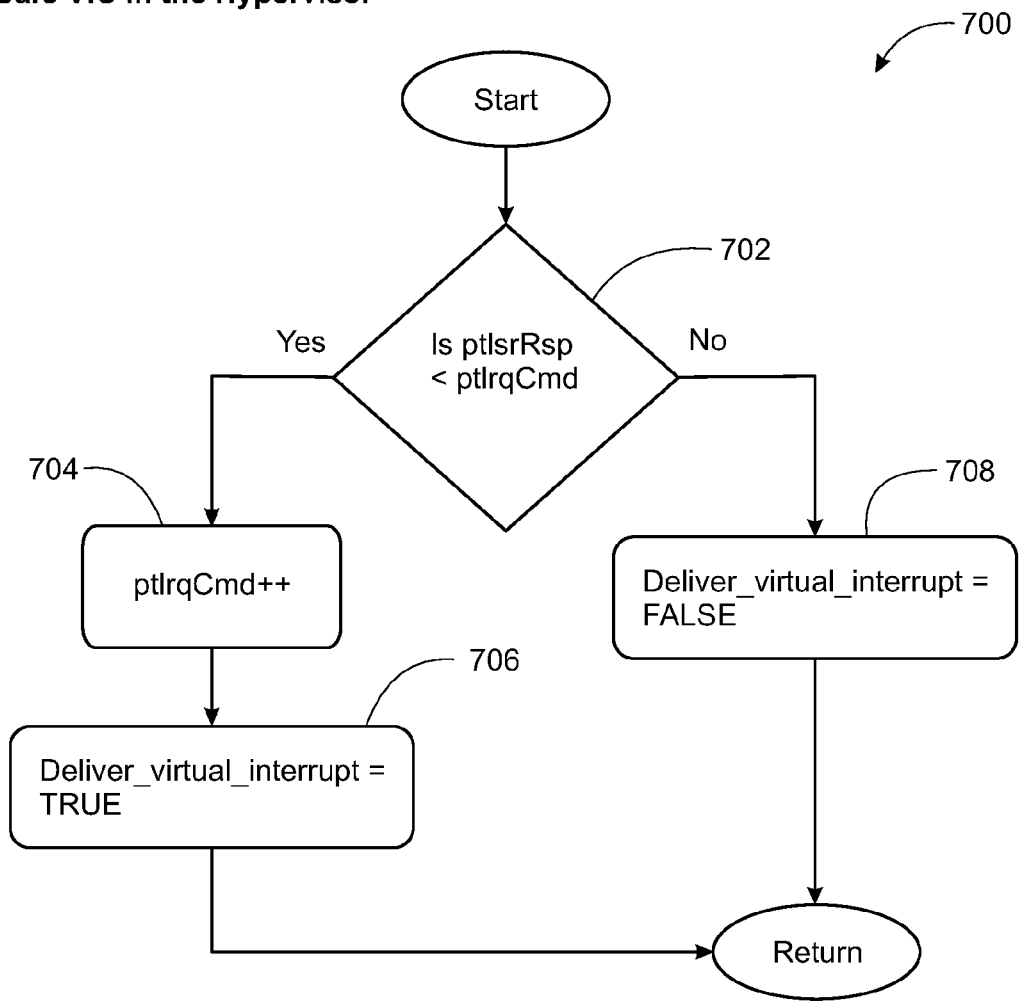
FIG. 7 is an illustrative flow diagram of an aspect of a 'safe' interrupt coalescing process that runs in the virtualization intermediary of the system of FIG. 4.

FIG. 7 is an illustrative flow diagram of an aspect of the 'safe' interrupt coalescing process 700 that runs in the virtualization intermediary of the system of FIG. 4. In particular, the process 700 is performed by the interrupt coalescing unit 436 of the virtualization intermediary 412. The modules of FIG. 7 represent the virtualization intermediary 412 configuring one or more physical processors of the host system 402, according to machine readable program code stored in machine readable storage media of the host system 402, to perform specified functions the modules. In order to implement the virtualization intermediary side safe interrupt coalescing process 700, the virtualization intermediary 412 generates a unique identifier for every interrupt and tracks the state of the unique identifier in the shared memory region 500. The guest OS VF driver 409 maintains state in the shared memory region 500 indicating the unique identifier of the last virtual interrupt that it processed. The virtualization intermediary 412 consults the two state variables to avoid generating interrupts when the guest operating system VF driver 409 has not acknowledged a previously posted virtual interrupt.

In the 'safe' coalescing process, a result of the comparison of the first state variable (ptIrqCmd) value and the second state variable (ptIsrRsp) value is indicative of whether there are more IOs in the VF driver completion queue to be processed. If the comparison indicates that currently there are additional IO completions in the queue to be processed, then the virtualization intermediary 412 determines that it is safe to coalesce an interrupt and drops the next interrupt. If the comparison indicates that currently there are not additional IO completions in the queue to be processed, then the virtualization intermediary 412 determines that it is unsafe to coalesce an interrupt and delivers the next interrupt.

Decision module 702 determines whether the guest OS VF driver 409 has responded to the most recently issued virtual interrupt. More particularly, decision module 702 accesses shared memory 500 to read the value of ptIsrResp and compares a value of the second state variable with a value of the first state variable. In particular, a determination is made as to whether the second state variable value is less than the first sate variable value. The second state variable value (ptIsrResp) is a numeric interrupt state value written to shared memory by the guest OS VF driver 409 that identifies the virtual interrupt most recently completed by the VF driver 409. The value first state variable (ptIrqCmd) is a numeric interrupt state value known to the virtualization intermediary 412 that identifies the virtual interrupt most recently sent by the virtualization intermediary to the guest OS VF driver 409.

If decision module 702 determines that the VF driver has responded to the most recently issued virtual interrupt, then in module 704 the virtualization intermediary 412 increments the value first state variable (ptIrqCmd) to the value first state variable (ptIrqCmd)++ and writes that new state value to shared storage 500. Module 706 then determines to deliver the next interrupt, which is identified by the state value first state variable (ptIrqCmd)++ to the guest OS VF driver 409. If, on the other hand, decision module 702 determines that the VF driver has not responded to the most recently issued virtual interrupt, then module 708 determines to not deliver the next in line interrupt to the guest OS VF driver 409.

Figure 8:
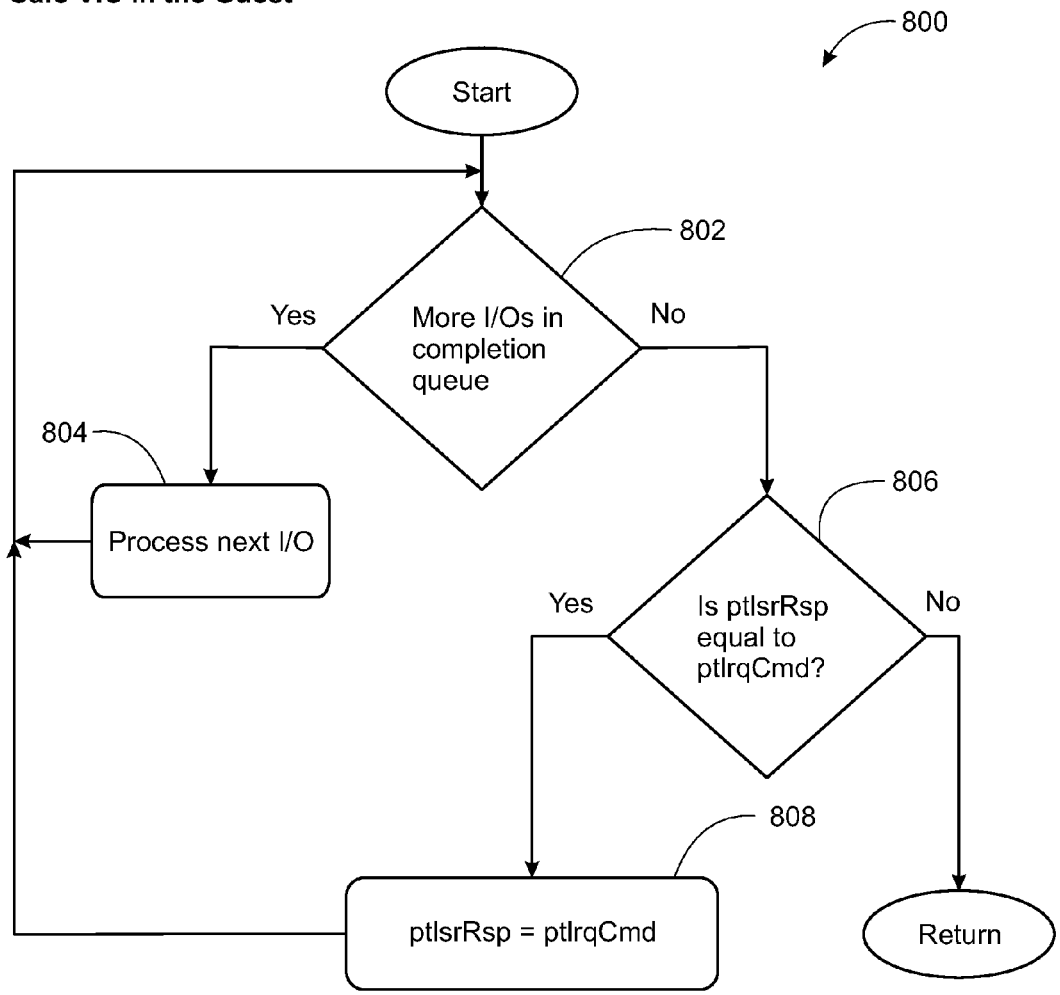
FIG. 8 is an illustrative flow diagram of an aspect of the 'safe' interrupt coalescing process that runs in the guest OS VF driver of the system of FIG. 4.

FIG. 8 is an illustrative flow diagram of an aspect of the 'safe' interrupt coalescing process 800 that runs in the guest OS VF driver 409 of the system of FIG. 4. The modules of FIG. 8 represent the guest OS 411 configuring one or more virtual processors of the guest system 402, according to machine readable program code stored in machine readable storage media of the host system 402, to perform a specified functions the modules. The guest OS side, safe interrupt coalescing process 800, uses the unique identifiers generated for the virtualization intermediary side safe process 700. The guest OS VF driver 409 consults the two state variables to determine whether there are additional interrupts to be serviced in the SCSI completion queue of buffer 1000.

Decision module 802 determines whether the IO queue has reached an unsafe fill level in which it is unsafe to coalesce an interrupt. More specifically, in some embodiments the unsafe level is an empty level in which there currently no are determined to be no additional IOs in a SCSI IO completion queue. If decision module 802 determines that the unsafe level has not yet been reached (e.g., that there are additional IOs in the SCSI completion queue), then module 804 processes the next IO. If, on the other hand decision module 802 determines that there are the unsafe level has been reached (e.g., that there are no additional IOs in the completion queue), then in decision module 806 determines whether the most recently responded interrupt request is the same as the most recently requested interrupt request (i.e., whether second state variable (ptIsrRsp)=first state variable (ptIrqCmd)?). The guest OS 411 access the shared memory 500 to obtain the value for state value first state variable (ptIrqCmd). If is the two values match, then process 800 ends. If the two values do not match, then module 808 sets the state value second state variable (ptIsrRsp) equal to first state variable (ptIrqCmd); writes the new value of second state variable (ptIsrRsp) to shared memory 500; and feeds back the process 800 to decision module 802.

Process 800 handles a potential race condition by checking the IO completion queue for one last time after it sets the state variable Second state variable (ptIsrRsp) equal to the state value First state variable (ptIrqCmd) to deal with the race where a new IO is completed and a new physical interrupt is generated by the hardware after the guest OS determines that all of the IO commands in the hardware completion ring have been drained but before it updates the state variable reflecting that it has responded to an interrupt from the virtualization intermediary 412.

Also, by setting the state variable Second state variable (ptIsrRsp) equal to the state value First state variable (ptIrqCmd) in module 808, the guest OS 411 ensures that the next time the virtualization intermediary 412 checks the comparative values of state values Second state variable (ptIsrRsp) and First state variable (ptIrqCmd), in decision module 702, the decision outcome will result in changing the value of the state value First state variable (ptIrqCmd) in module 704 and the delivery of a virtual interrupt in module 706.

Figure 9:
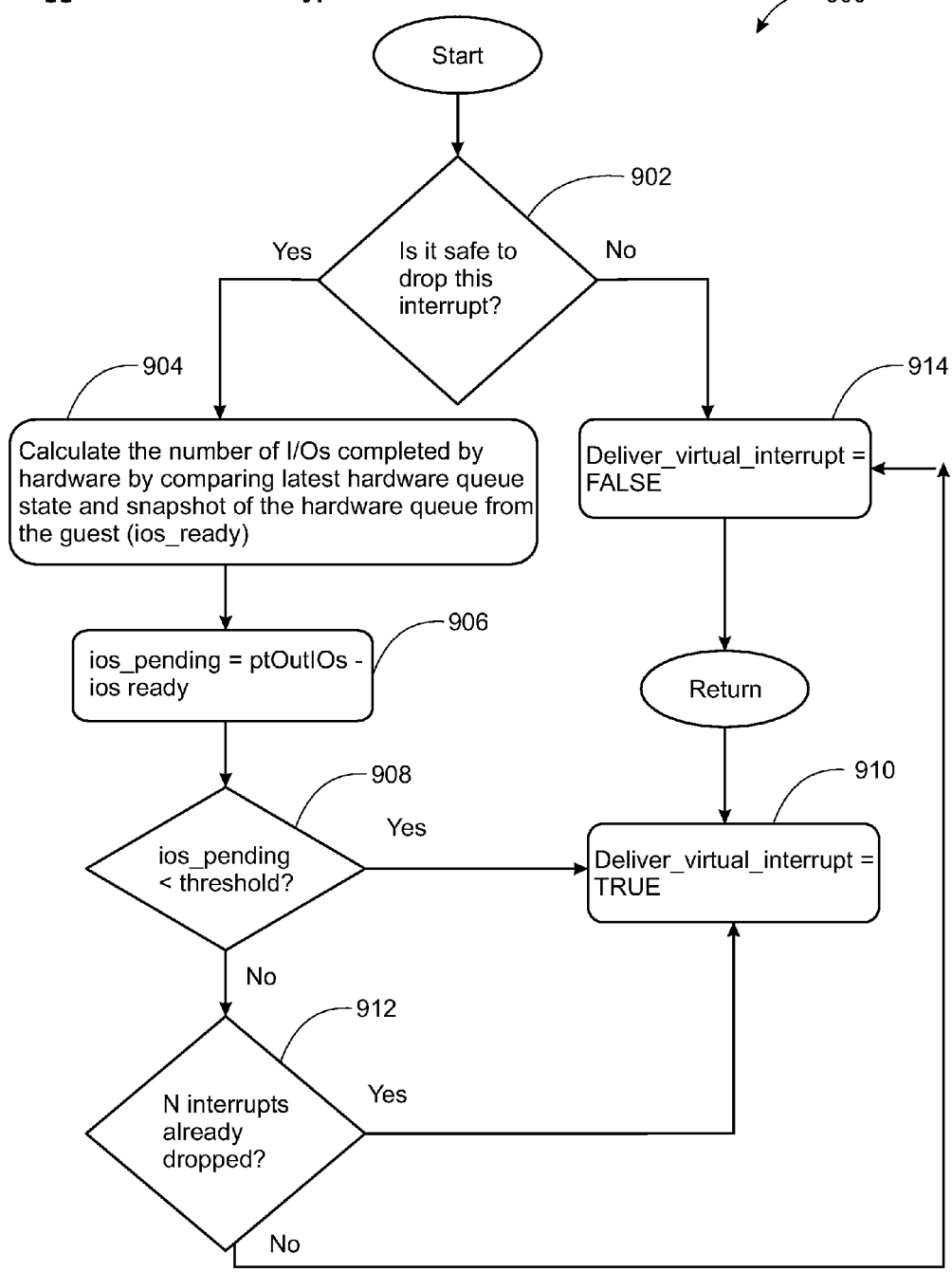
FIG. 9 is an illustrative drawing of a flow diagram of an aspect of the 'aggressive' interrupt coalescing process that runs in the virtualization intermediary of the system of FIG. 4.

FIG. 9 is an illustrative drawing of a flow diagram of an aspect of the 'aggressive' interrupt coalescing process 900 that runs in the virtualization intermediary of the system of FIG. 4. Specifically, the process 900 is performed by the interrupt coalescing unit 436 of the virtualization intermediary 412. The modules of FIG. 9 represent the virtualization intermediary 412 configuring one or more physical processors of the host system 402, according to machine readable program code stored in machine readable storage media of the host system 402, to perform a specified functions the modules. The unit 436 consults state variables within the shared memory to determine whether to issue or drop interrupts.

The aggressive virtual interrupt coalescing process 900 seeks to dynamically throttle the virtual interrupt delivery rate proportional to the number of outstanding SCSI CDBs from the guest OS VF driver 409. The strategy behind the aggressive process 900 is that the time taken for the next SCSI CDB completion to arrive is likely to be inversely proportional to the depth of the SCSI CDB request queue, and that the deeper the queue of SCSI CDB requests, more interrupts can be coalesced without affecting the latency of the IO workload. In some embodiments, the 'aggressive' process is used in conjunction with the 'safe' process. Specifically, even if the 'safe' process determines that it is not safe to coalesce an interrupt, the 'aggressive' process nevertheless determines whether to coalesce an interrupt using more 'aggressive' criteria. As explained below, the more aggressive criteria include a measure of the number of outstanding IO requests (e.g. SCSI CDBs) that have not yet been completed and are 'on the wire' (i.e. have been sent to storage 408 but have for which IO completions have not yet arrived in the IO completion queue) and based on a latency measure.

Figure 11:
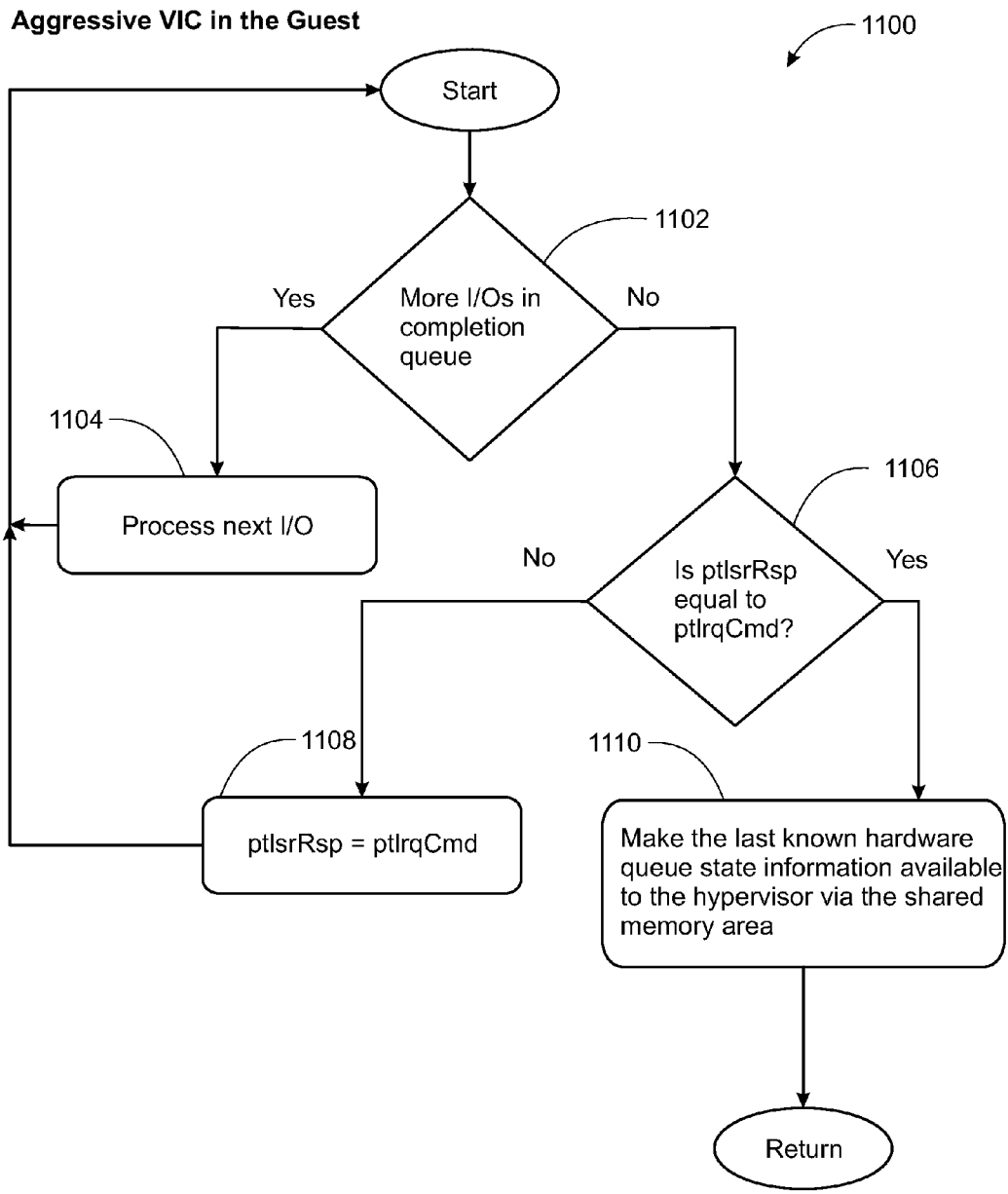
FIG. 11 is an illustrative flow diagram of a process by which the guest OS accesses the circular buffer of FIG. 10 to service queued SCSI completions and provides a snapshot of buffer status.
Figure 12:
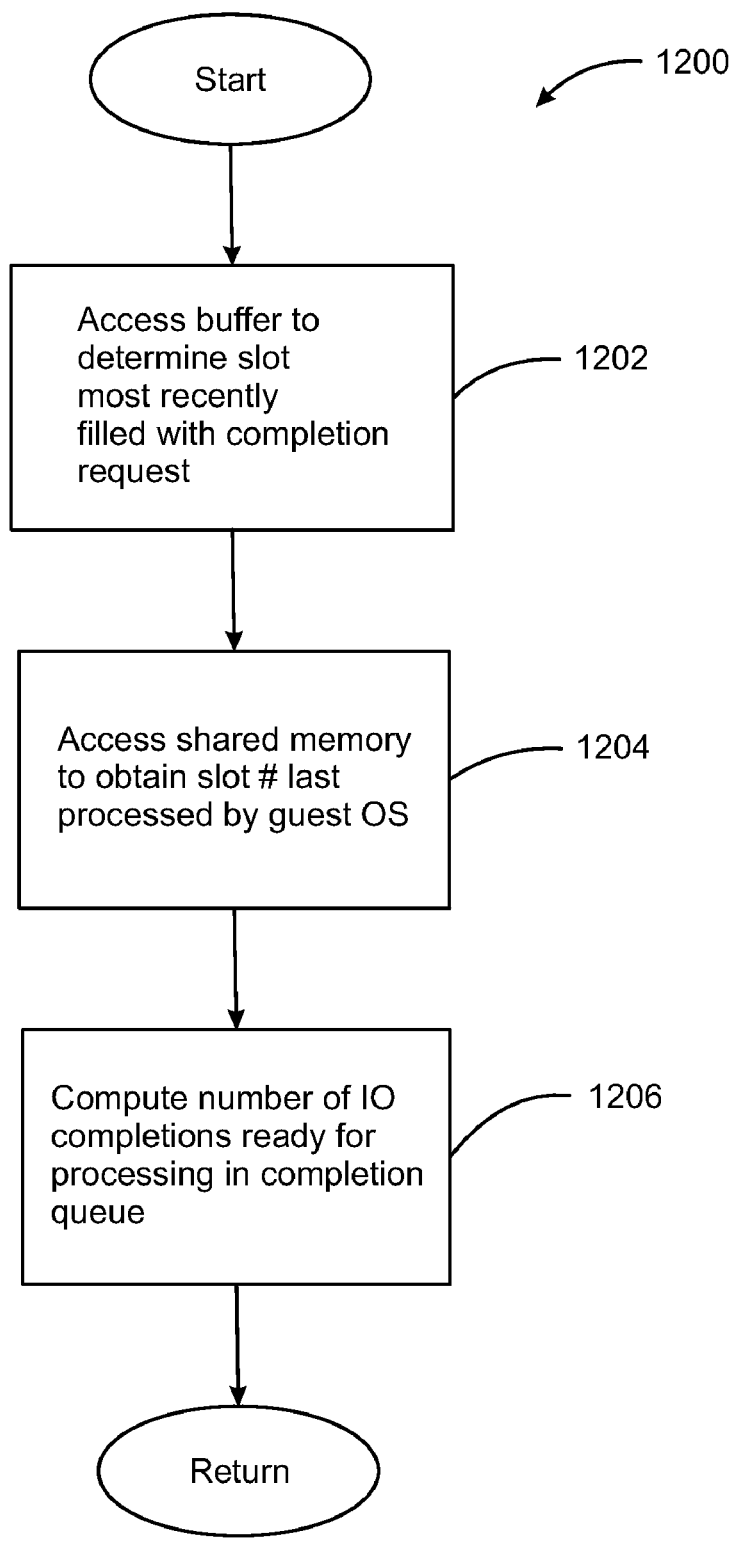
FIG. 12 is an illustrative flow diagram of a process in which the virtualization intermediary determines a number of SCSI completions queued within buffer of FIG. 10.

Module 902 of FIG. 9 indicates that the outcome of the safe process 700 of FIG. 7 determines whether an interrupt is eligible to be considered for being dropped under the aggressive process 900. When the 'safe' process 700 determines that it is not safe to coalesce a current virtual interrupt, then module 904 derives a count of the number of SCSI completions that are queued and awaiting servicing by the guest OS 411. Reference is made to FIGS. 11-12 to explain acts of module 904.

Figure 10:
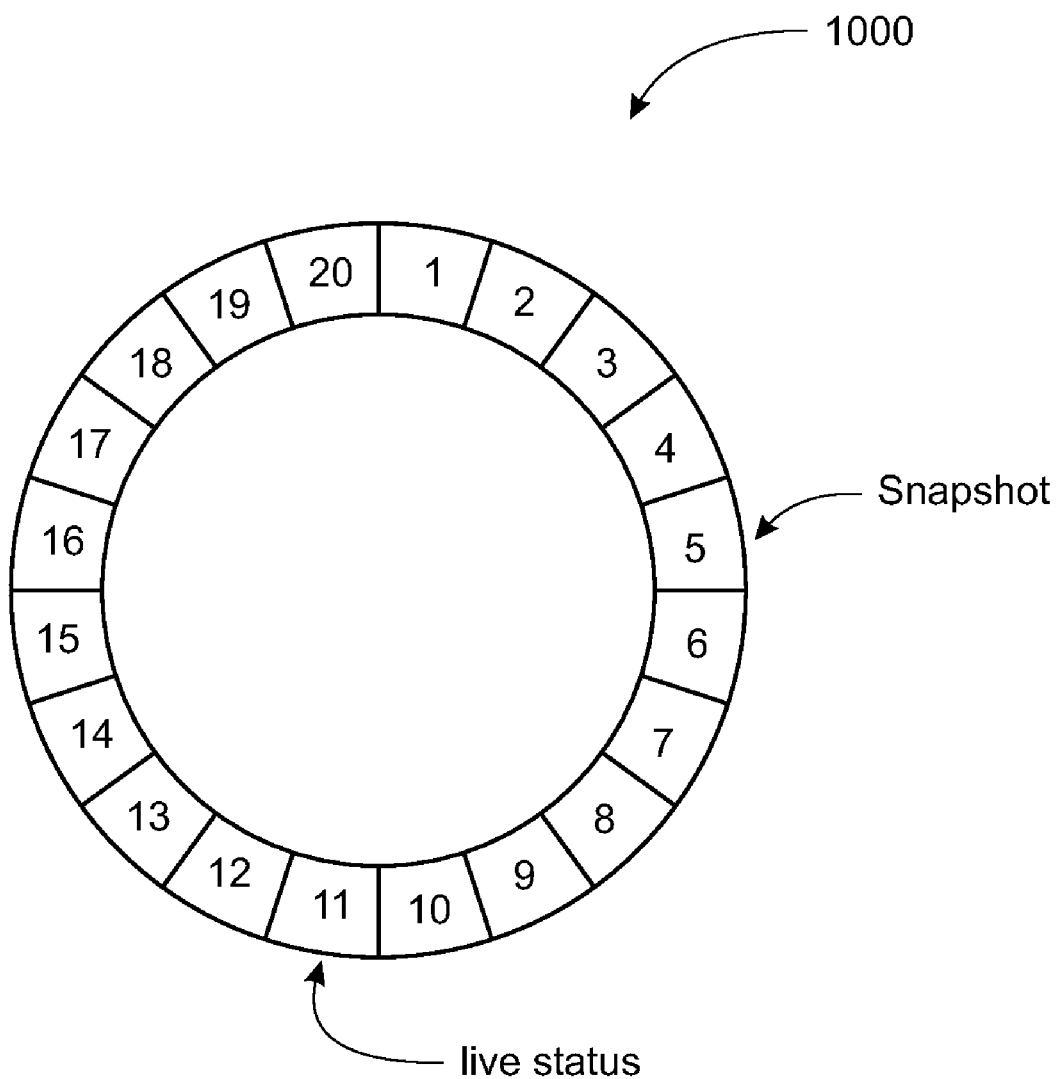
FIG. 10 is an illustrative drawing representing a circular buffer that serves as a SCSI completion queue for the system of FIG. 4.

FIG. 10 is an illustrative drawing representing a circular buffer 1000 that serves as a SCSI completion queue. The buffer 1000 includes a sequence of buffer location slots in which SCSI completions are queued to be serviced by the guest OS VF driver 409. The example circular buffer 1000 within the host machine 402 contains a sequence of slots identified as #1-#20. The buffer 1000 is disposed in host memory in which the completions in the slots are accessible to the guest OS 411. In operation, SCSI completions returned by storage 406 are added to the buffer 1000 in sequence order. For example, an IO completion is added to slot #6 after an IO completion has been added to slot #5. In this example, slot #5 is identified as being the "shapshot" slot, and slot #11 is identified as being the "live" status slot. When the guest OS VF driver 409 receives a virtual interrupt, the driver 409 will service all SCSI completions currently queued in the buffer 1000.

FIG. 11 is an illustrative flow diagram of a process 1100 of an aspect of the 'aggressive' interrupt coalescing process 1100 that runs in the guest OS VF driver 409 of the system of FIG. 4. Note that respective modules 1102-1108 of process 1100 are identical to modules 802-808 of process 800 of FIG. 8. However, module 1110 is unique to process 1100. Module 1110 reports to shared memory 500 a value identified as snapshot value (ptCmpProdIdxLastIntr), which shall be referred to as the 'snapshot' value that indicates the last slot from which an SCSI IO was serviced during this access to the buffer 1000.

In operation, following the guest OS 411 servicing of all of the SCSI completions pending in the circular buffer 1000 per process 1100 of FIG. 11, subsequent new SCSI completions sent by the storage 408 will be added to the circular buffer 1000 starting with the last slot from which the IO completion was serviced.

Moreover, the guest OS 411 keeps a running tally of outstanding SCSI CDBs that it has sent and for which it has not yet serviced a completion. Basically, the tally value represents the total number of SCSI CDBs dispatched (i.e. in the IO request queue or 'on the wire') minus the total number of SCSI completions serviced by the guest OS 411. The guest OS 411 keeps the tally value updated in the shared memory 500 as a tally value (ptOutIOs).

FIG. 12 is an illustrative flow diagram of a process 1200, generally corresponding to block 904 of FIG. 9, in which the interrupt coalescing unit 436 of the virtualization intermediary 412 determines a number of SCSI IOs that are currently in the SCSI completion queue within circular buffer 1000 and ready to be serviced. In module 1202, the unit 436 accesses state of the buffer 1000 to determine the last slot in which a SCSI completion was most recently added, which will be referred to as the 'live' value. In module 1204, the unit 436 accesses shared memory 500 to obtain the snapshot' value, which indicates the last slot from which a SCSI completion was serviced during the last access to the buffer 1000 by the guest OS 411. In module 1206, the unit 436 computes the value 'ios ready", the number of SCSI completions in the buffer. In this example, the number of SCSI completions queued in the buffer 100 is represented by the difference between the live value (obtained in module 1202) and the snapshot slot value (obtained in module 1204).

For example, referring again to FIG. 10, if the live value is 11 and the snapshot value is #5, then seven (7) SCSI completions were added to the SCSI completion queue since the guest OS 411 last serviced the completions in the buffer 1000.

Referring again to FIG. 9, module 906 determines the number of SCSI CDBs (requests) sent by the guest OS 411 that have not yet been processed, i.e. for which no SCSI completion has been received from storage 408. This value shall be referred to as the "SCSI CDBs pending value" or "ios_pending". The SCSI CDBs pending value ("ios_pending"), is the difference between the running tally, "tally value (ptOutIOs)", reported by the guest OS 411 to shared memory 500 and the number of SCSI completions "ios ready", in the buffer equal determined by process 1200 of FIG. 12.

Decision module 908 determines whether the "SCSI CDBs pending value" ("ios_pending") exceeds a selected threshold. If not, then module 910 determines to deliver the current virtual interrupt. If decision module 908 determines that the SCSI CDBs pending value does exceed the threshold, then decision module 912 determines whether a selected number N interrupts already have been dropped. If so, then module 910 determines to deliver the current virtual interrupt. If decision module 908 determines that N interrupts have not yet been dropped, then module 914 determines to drop the current virtual interrupt.

Thus, the aggressive process 900 drops interrupts only if there is a selected (threshold) number of pending SCSI CDBs that have not yet resulted in IO completions landing in the IO completion queue, but only if some selected number (N) of interrupts have not been dropped previously. The threshold number of pending SCSI CDBs is selected to ensure that there so that a high enough volume of SCSI requests to justify aggressive interrupt coalescing. The number N is selected to balance latency in servicing of SCSI completions due to aggressive interrupt coalescing.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for coalescing input/output (IO) interrupts to a virtual machine (VM) running on a host computer comprising the steps of:
   receiving, at a virtualization layer of the host computer that supports execution of the VM, an IO interrupt in response to a completion of an IO request of the VM, wherein a transmission of the IO request by the VM to an IO device bypasses the virtualization layer;
   determining, at the virtualization layer, whether the VM has responded to a most recently delivered IO interrupt to the VM by the virtualization layer; and
   dropping, by the virtualization layer, the IO interrupt if the VM has not responded to the most recently delivered IO interrupt, thereby failing to deliver the IO interrupt to the VM.

2. The method of claim 1, further comprising the step of delivering, by the virtualization layer, the IO interrupt to the VM if the VM has responded to the most recently delivered IO interrupt.

3. The method of claim 1, if the VM has responded to the most recently delivered IO interrupt, further comprising the steps of:
   determining, at the virtualization layer, a number of pending IO requests transmitted by the VM to the IO device for which the IO device has not yet responded to the host computer;

if the number of pending IO requests does not exceed a threshold value, delivering, by the virtualization layer, the IO interrupt to the VM; and if the number of pending IO requests exceeds the threshold value, (i) delivering, by the virtualization layer, the IO interrupt to the VM if a predetermined number of IO interrupts have already been dropped, and (ii) dropping the IO interrupt if the predetermined number of IO interrupts have not been dropped.

4. The method of claim 3, wherein the step of determining the number of pending IO requests transmitted by the VM to the IO device for which the IO device has not yet responded to the host computer further comprises calculating a difference between a first variable that represents a number of IO requests in a buffer that have been transmitted by the VM and for which the VM has not yet handled and a second variable that represents a number of IO requests in the buffer for which the IO device has responded to the host computer and are ready to be handled by the VM.

5. The method of claim 4, wherein at least the first variable is stored in a shared memory accessible by the VM and virtualization layer and is updated by the VM during execution of the VM.

6. The method of claim 1, wherein the determining step further comprises comparing a first identifier that identifies an IO interrupt that has been most recently handled by the VM with a second identifier that identifies an IO interrupt that has been most recently delivered by the virtualization layer to the VM, wherein the first identifier and second identifier are (i) updated by the VM and the virtualization layer, respectively, and (ii) are stored in a shared memory accessible by the VM and the virtualization layer.

7. The method of claim 4, wherein the update of the first identifier by the VM is performed by an IO device driver in a guest operating system of the VM, wherein the IO device driver is aware of and has access to the shared memory.

8. A non-transitory computer readable storage medium including instructions that, when executed on a computer processor, causes the computer processor to coalesce input/output (IO) interrupts to a virtual machine (VM) running on a host computer, by performing the steps of:
    receiving, at a virtualization layer of the host computer that supports execution of the VM, an IO interrupt in response to a completion of an IO request of the VM, wherein a transmission of the IO request by the VM to an IO device bypasses the virtualization layer;
    determining, at the virtualization layer, whether the VM has responded to a most recently delivered IO interrupt to the VM by the virtualization layer; and
    dropping, by the virtualization layer, the IO interrupt if the VM has not responded to the most recently delivered IO interrupt, thereby failing to deliver the IO interrupt to the VM.

9. The non-transitory computer-readable storage medium of claim 8, wherein the instructions further perform the step of delivering, by the virtualization layer, the IO interrupt to the VM if the VM has responded to the most recently delivered IO interrupt.

10. The non-transitory computer-readable storage medium of claim 8, wherein, if the VM has responded to the most recently delivered IO interrupt, the instructions further perform the steps of:
    determining, at the virtualization layer, a number of pending IO requests transmitted by the VM to the IO device for which the IO device has not yet responded to the host computer;

if the number of pending IO requests does not exceed a threshold value, delivering, by the virtualization layer, the IO interrupt to the VM; and if the number of pending IO requests exceeds the threshold value, (i) delivering, by the virtualization layer, the IO interrupt to the VM if a predetermined number of IO interrupts have already been dropped, and (ii) dropping the IO interrupt if the predetermined number of IO interrupts have not been dropped.

11. The non-transitory computer-readable storage medium of claim 10, wherein the step of determining the number of pending IO requests transmitted by the VM to the IO device for which the IO device has not yet responded to the host computer further comprises calculating a difference between a first variable that represents a number of IO requests in a buffer that have been transmitted by the VM and for which the VM has not yet handled and a second variable that represents a number of IO requests in the buffer for which the IO device has responded to the host computer and are ready to be handled by the VM.

12. The non-transitory computer-readable storage medium of claim 11, wherein at least the first variable is stored in a shared memory accessible by the VM and virtualization layer and is updated by the VM during execution of the VM.

13. The computer-readable storage medium of claim 8, wherein the determining step further comprises comparing a first identifier that identifies an IO interrupt that has been most recently handled by the VM with a second identifier that identifies an IO interrupt that has been most recently delivered by the virtualization layer to the VM, wherein the first identifier and second identifier are (i) updated by the VM and the virtualization layer, respectively, and (ii) are stored in a shared memory accessible by the VM and the virtualization layer.

14. The non-transitory computer-readable storage medium of claim 12, wherein the update of the first identifier by the VM is performed by an IO device driver in a guest operating system of the VM, wherein the IO device driver is aware of and has access to the shared memory.

15. A host computer configured to coalesce input/output (IO) interrupts to a virtual machine (VM) running on the host computer, the host computer comprising a processor configured to perform the steps of:
    receiving, at a virtualization layer of the host computer that supports execution of the VM, an IO interrupt in response to a completion of an IO request of the VM, wherein a transmission of the IO request by the VM to an IO device bypasses the virtualization layer;
    determining, at the virtualization layer, whether the VM has responded to a most recently delivered IO interrupt to the VM by the virtualization layer; and
    dropping, by the virtualization layer, the IO interrupt if the VM has not responded to the most recently delivered IO interrupt, thereby failing to deliver the IO interrupt to the VM.

16. The host computer of claim 15, wherein the processor is further configured to perform the step of delivering, by the virtualization layer, the IO interrupt to the VM if the VM has responded to the most recently delivered IO interrupt.

17. The host computer of claim 15, wherein, if the VM has responded to the most recently delivered IO interrupt, the processor is further configured to perform the steps of:
    determining, at the virtualization layer, a number of pending IO requests transmitted by the VM to the IO device for which the IO device has not yet responded to the host computer;

if the number of pending IO requests does not exceed a threshold value, delivering, by the virtualization layer, the IO interrupt to the VM; and if the number of pending IO requests exceeds the threshold value, (i) delivering, by the virtualization layer, the IO interrupt to the VM if a predetermined number of IO interrupts have already been dropped, and (ii) dropping the IO interrupt if the predetermined number of IO interrupts have not been dropped.

18. The host computer of claim 17, wherein the step of determining the number of pending IO requests transmitted by the VM to the IO device for which the IO device has not yet responded to the host computer further comprises calculating a difference between a first variable that represents a number of IO requests in a buffer that have been transmitted by the VM and for which the VM has not yet handled and a second variable that represents a number of IO requests in the buffer for which the IO device has responded to the host computer and are ready to be handled by the VM.

19. The host computer of claim 18, wherein at least the first variable is stored in a shared memory accessible by the VM and virtualization layer and is updated by the VM during execution of the VM.

20. The host computer of claim 15, wherein the determining step further comprises comparing a first identifier that identifies an IO interrupt that has been most recently handled by the VM with a second identifier that identifies an IO interrupt that has been most recently delivered by the virtualization layer to the VM, wherein the first identifier and second identifier are (i) updated by the VM and the virtualization layer, respectively, and (ii) are stored in a shared memory accessible by the VM and the virtualization layer.

* * * * *